United States Patent Office 3,804,827
Patented Apr. 16, 1974

---

3,804,827
1-β - D - ARABINOFURANOSYLCYTOSINE - 3',5'-CYCLIC PHOSPHATE AND DERIVATIVES THEREOF
Roland K. Robins, Santa Ana, and Robert A. Long, Costa Mesa, Calif., assignors to ICN Pharmaceuticals, Inc., Pasadena, Calif.
No Drawing. Filed Feb. 28, 1972, Ser. No. 230,127
Int. Cl. C07d 51/52
U.S. Cl. 260—211.5 R                              13 Claims

ABSTRACT OF THE DISCLOSURE

As antiviral agents, 1-β-D-arabinofuranosylcytosine-3',5'-cyclic phosphates and derivatives thereof, e.g., acylated, 5'-halogenated and N³-oxide analogs. The principal compound is prepared by cyclizing cytidylic acid 2'(3') mixed isomers to the 2',3'-cyclic phosphate, which is dehydrated to yield the 3' phosphate, the latter in turn undergoing cyclization to afford the 3',5'-cyclic nucleotide. Novel 4-thio analogs of the principal compound variously exhibiting in vitro tumor inhibitory and immunosuppressant properties are also disclosed, as are precursors useful in their synthesis.

BACKGROUND OF THE INVENTION

1-β-D-arabinofuranosylcytosine (ara-C) is described and claimed in U.S. Pat. 3,116,282 to Hunter as active against microorganisms, including viruses. Its antiviral and antitumor activities, as since reviewed by Cohen, "Introduction to the Biochemistry of D-Arabinosyl Nucleosides," Progr. Nucleic Acid Res. 5, 1–88 (1966), have been well established. For example, ara-C has been shown to be effective in the treatment of herpes keratitis in experimentally infected rabbits, and also in man. In clinical studies, Chow et al., Antimicrobial Agents and Chemotherapy (1970) 214, found ara-C "highly effective" in the treatment of a number of other herpes virus infectious, including herpes simplex encephalities. With the expressed aim of influencing the mechanism of action, transport or cross-resistance phenomena of ara-C, Wechter prepared a number of dinucleoside phosphates containing ara-C [J. Med. Chem. 10, 762 (1967)] and first produced the 5'-phosphate of ara-C as an intermediate (See U.S. Pat. 3,300,478) to those compounds, as by phosphorylation of 1-β-D (2',3'dibenzoylarabinofuranosyl) N-benzoylcytosine followed by base hydrolysis and debenzylation. Cytotoxicity and antiviral activity of ara-C was compared to that of the 5'-phosphate and a large number of the dinucleoside phosphates by Renis, who concluded in Cancer Res. 30, 189 (January 1970) that the activity of phosphorylated derivatives of ara-C was due to ara-C itself, which became available after enzymatic hydrolysis. Renis and others, as reported in J. Med. Chem. 10, 777 (1967), found ara-C more active against herpes virus than any of its 2'-, 3'- or 5'-phosphates, and suggested cleavage of those phosphates and the dinucleoside phosphates to free ara-C to be an a priori requisite to their biological activity. The 5'-phosphate of ara-C was shown by Schrecker and Golden, Cancer Res. 28, 802 (1968) to be dephosphorylated prior to uptake by tumor cells. The 2',5'-cyclic phosphate of ara-C has been prepared by Wechter, who in J. Org. Chem. 34, 244 (1969) reports it to be devoid of the antiviral activity associated with the parent nucleotide. The sense of the prior art, then, is that phosphorylation of ara-C gains no activity advantage, acting instead to diminish activity to a degree depending upon the rate at which a particular phosphate is hydrolyzed to the free nucleoside at the cell surface.

BRIEF SUMMARY OF THE INVENTION

According to this invention, there are provided as antiviral agents ara-C 3',5'-cyclic phosphates, i.e., compounds of structure

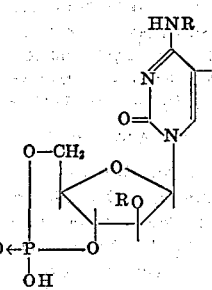

wherein R is hydrogen or C₁–C₁₈ acyl and X is hydrogen or halogen, and physiologically acceptable salts thereof. The preferred compound of the invention, ara-C 3',5'-cyclic phosphate was found to be superior to ara-C itself against herpes simplex encephalitis in vivo studies, and is cytotoxic to tumor cells in vitro. The invention also provides bioactive derivatives arising from substitutive operations on the aglycon of that compound, as well as novel precursors for those derivatives. These and other objects and advantages of the invention will be apparent from the foregoing and from the detailed description which follows.

DETAILED DESCRIPTION OF THE INVENTION

1 - β-D-arabinofuranosylcytosine-3',5'-cyclic phosphate (ara-C 3',5' cyclic phosphate) is prepared from cytidylic acid 2'(3') mixed isomers 1 according to the following reaction scheme:

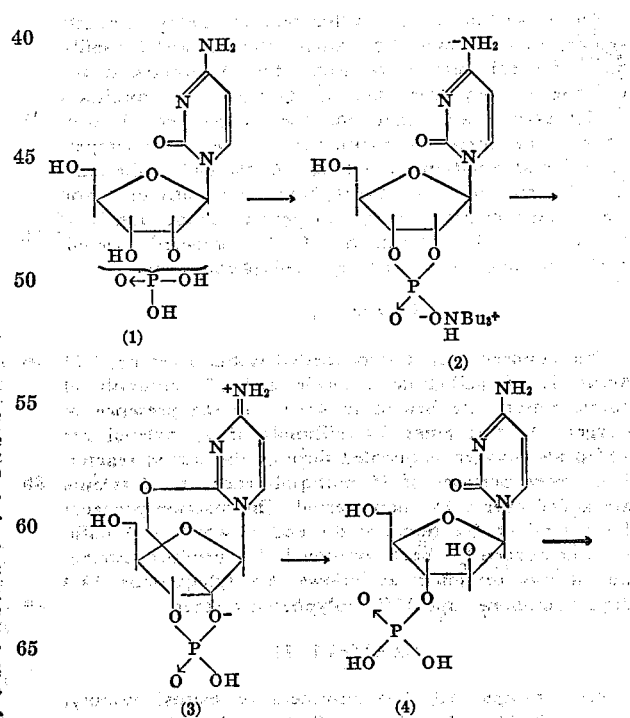

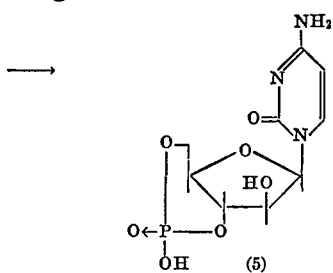

By the method of Michelson, J. Chem. Soc. 3655 (1959), a suspension of 1 in water is solubilized with tributylamine and ethylchloroformate added. Dehydration permits cyclization, yielding the tributylamine salt of the 2',3'-cyclic phosphate (2). $O^2,2'$-anhydrocytidine 3'-phosphate (3) is next formed according to the method of Nagavary, J. Am. Chem. Soc. 91, 5409 (1969), by taking to dryness the product of heating 2 with trimethylsilyl chloride in pyridine and tributylamine. Treatment of 3 with alkali or bicarbonate opens the anhydro bond, affording the 3'-phosphate 4, which may be cyclized in pyridine with N,N'-dicyclohexylcarbodiimide (DCC) to obtain the desired ara-C 3',5'-cyclic phosphate 5.

The invention also comprises ara-C-3',5'-cyclic phosphate analogs bearing halogen in the 5-position, as well as intermediates therefor. 5-iodo, -chloro, and -bromo analogs may be approached by direct halogenation at the election-rich 5-position of the cyclic nucleotides of the invention with reagents appropriate to the desired end, e.g., iodomonochloride in diethylacetamide, N-chlorosuccinimide (NCS) or N-bromosuccinimide (NBS), and bromine. The 5-fluorinated cyclic nucleotide should result from reaction of the N,2'-diacetyl-blocked cyclic nucleotide with trifluoromethyl hypofluorite, followed by deacetylation. Preferably, however, the compound is obtained according to the method of M. J. Robins et al., J. Am. Chem. Soc. 93, 5277 (1971) for 5-fluoro cytidine arabinoside, i.e., ara-C-3'-phosphate is reacted with $CF_3OF$ in $CCl_3F$ to yield 5-fluoro-ara-C-3'-phosphate, which is in turn cyclized with DCC to yield the desired product. Corresponding 5-bromo and 5-chloro cyclic nucleotides may be obtained by reaction of the 3'-phosphate under similar conditions with, e.g., bromine, NBS or NCS. Ara-C analogs bearing halogen in the 5-position have been shown to possess antiherpes activity, e.g., Renis, Cancer, supra, the 5-halogenated analogs of the 3',5'-cyclic phosphate of ara-C can be expected to display similar activity, especially in view of our finding that 5-fluoro ara-C-3',5' cyclic phosphate and its 5-fluoro ara-C-3'-phosphate precursor exhibit antiviral activity.

The invention also encompasses a number of other derivatives of the principal compound, which may be prepared according to the following scheme, "Ac" being acyl and "AP" β-D-arabinofuranosyl 3',5'-cyclic phosphate:

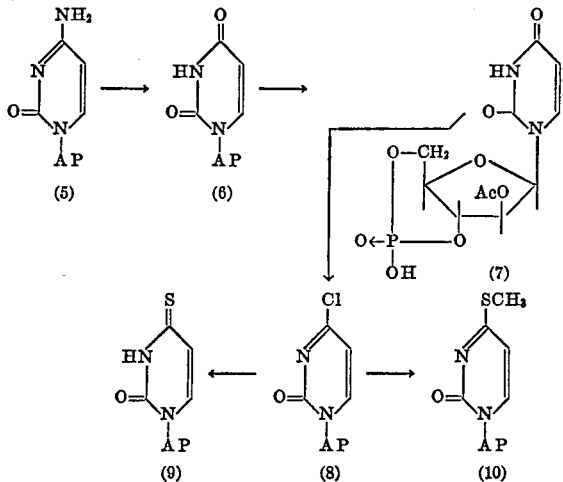

With reference to compounds 6 and 9, it will be understood that equilibrium obtains as between their isomers:

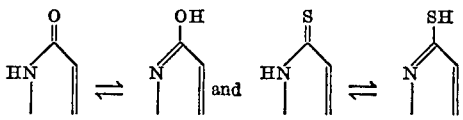

respectively, and characterization of their distinctive groups as, e.g., "hydroxyl" and "mercapto" is not to be taken as particular to one or the other isomer of the respective compounds.

Deamination of 5 with $NaNO_2$ yields 1-β-D-arabinofuranosyl)-uracil-3',5'-cyclic phosphate 6. Acylation of 6 in pyridine, as with acetic anhydride, provides the acyl-blocked analog 7. Treatment of 7 with $SOCl_2$: dimethylformamide in refluxing chloroform provides the corresponding acyl-blocked 4-chloro analog, which upon deacylation yields 1-β-D-arabinofuranosyl-4-chloro-2-oxopyrimidine - 3',5' - cyclic phosphate 8. Nucleophilic displacement of chloro in this compound with sodium hydrogen sulfide or sodium methylmercaptide affords, respectively, 1-β-D-arabinofuranosyl - 4 - thiouracil-3',5'-cyclic phosphate 9 or 1-β-D-arabinofuranosyl-4-methylthio-2-oxo-pyrimidine-3',5'-cyclic phosphate 10. The bioactivity of the latter two compounds is discussed infra.

Preferably, however, compounds 9 and 10 are successively obtained by direct reaction of 5 and $H_2S$ according to the procedure of Ueda, Tetrahedron Letters, No. 27, pp. 2507-10 (Pergamon Press, 1971), affording 9, from which compound 10 may be obtained by alkylation.

The cyclic nucleotides may be acylated at the 4-amino group and at the 2'-hydroxyl with $C_1$–$C_{18}$ acyl groups, preferably $C_1$–$C_4$ acyl groups, as by reaction with appropriate acid anhydrides or acid halides in base. Sutherland et al., Biochim. et Biophys. Acta 148, 106 (1967) have demonstrated that acylation of cyclic nucleotides enhances cellular transport. Moreover, acylation of the 4-amino group is efficacious in reducing the possibility of enzymatic deamination. Ara-C is known to undergo enzymatic deamination in vivo with concomitant loss of biological activity. While the corresponding 3',5'-cyclic phosphate itself appears more resistant to deamination than the free nucleoside, as is discussed hereafter, that resistance may be further enhanced by converting the cyclic nucleotide and its analogs to corresponding $N^3$-oxides, as by treatment with meta-chloroperbenzoic acid. The $N^3$-oxide of ara-C itself has been prepared by others. R. P. Panzica et al., J. Med. Chem. 14, 259 (1971).

As will be apparent to those of skill in the art from this disclosure, the compounds of the invention may be employed in the form of their physiologically acceptable salts, e.g., ammonium, sodium and triethylamine salts prepared by neutralizing the 3',5'-cyclic phosphate with the appropriate base.

D. Gish et al., in J. Med. Chem. 14, 882 (1971) report $O^2,2'$-anhydrocytidine to be active in vitro against herpes virus, and that the compound was markedly superior to ara-C itself in increasing life span of L1210 leukemic mice. $O^2$, 2'-anhydrocytidine 3',5'-cyclic phosphate prepared by dehydration of ara-C-3',5'-cyclic phosphate with $POCl_3$ in ethyl acetate at reflux can be expected similarly to mimic if not improve upon the activity of cyclic nucleotide per se. An alternative route to the anhydro compound involves activation of the 2'-hydroxyl of ara-C-3',5'-cyclic phosphate with, e.g., a mesyl or tosyl "leaving group," as by reacting the cyclic nucleotide with mesyl chloride or tosyl chloride, followed by treatment with strong base such as NaOH, securing 2-oxo displacement of the leaving group (and therefore the anhydro cyclic nucleotide).

Parallal tests with ara-C and ara-C-3',5'-cyclic phosphate showed them to be equally cytotoxic to KB, H.EP. #2 and HeLa tumor cell monolayers, but significantly, the cyclic nucleotide was less toxic toward non-tumor cell lines tested as well.

The invention is further illustrated in the following examples of preferred embodiments thereof.

EXAMPLE 1

1-β-D-arabinofuranosylcytosine-3',5'-cyclic phosphate (5)

1-β-D-arabinofuranosylcytosine-3'-phosphate (5.77 g., 17.9 mmole) and 4-morpholine-N,N'-dicyclohexylcarbosamidine (5.24 g., 17.9 mmole) were dissolved in anhydrous dimethylformamide (100 ml.) by heating to reflux for 5 minutes. The solvent was removed in vacuo. Anhydrous dimethylformamide (50 ml.) was added and the solvent again was removed in vacuo. The resulting foam was dissolved in boiling dimethylformamide (150 ml.) and the resulting solution was added dropwise over a period of 105 minutes to a vigorously refluxing solution of dicyclohexylcarbodiimide (21 g., 101.0 mmole) in anhydrous pyridine (4.5 l.). The solution, following the addition, was refluxed 60 minutes and then a vertical concentrater was attached and the solution was concentrated with heating in vacuo to a volume of approximately 400 ml. Water (400 ml.) was added to the cool solution followed by ether (600 ml.). The insoluble dicyclohexylurea was removed by filtration, washed well with water (200 ml.) and discarded. The aqueous layer of the filtrate was reduced to dryness. Ethanol (100 ml.) was added and removed in vacuo. The resulting gum was dissolved in water (150 ml.), ether (200 ml.) was added and the resulting dicyclohexylurea was removed by filtration. The aqueous layer was acidified with 12 N HCl to pH 1 and stirred for 5 minutes. Concentrated base (NaOH, 3 N) was added rapidly to obtain pH 6. The resulting solution was applied to a column (50 cm. x 6 cm. dia.) of Schleicher and Schuell standard grade diethylaminoethyl cellulose in the bicarbonate form. Elution was carried out using a linear salt gradient with 0.025 M triethylammonium bicarbonate, pH 7.5 (2 l.), in the reservoir and water (2 l.) in the mixing chamber. This gradient was followed by a linear salt gradient of 0.075 M triethylammonium bicarbonate pH 7.5 (2 l.), in the reservoir and 0.025 M triethylammonium bicarbonate pH 7.5 (2 l.) in the mixing chamber. Fraction (20 ml.) were collected at 3 min. intervals, the elution of products being followed spectrophotometrically at 254 mμ. 1-β-D-arabinofuranosylcytosine-3',5'-cyclic phosphate appeared in fractions 160–323. The combined fractions were concentrated to dryness, the solid residue was taken up in water (100 ml.) and the solution evaporated to dryness to remove residual triethylammonium bicarbonate. The resulting solid was dissolved in water (100 ml.) and applied to a column (30 cm. x 4 cm. dia.) of Dowex 50W x 8 (H+ form). The elution of nucleotides was followed spectrophotometrically, with fractions (20 ml.) being collected. 1-β-D-arabinofuranosylcytosine-3',5'-cyclic phosphate appeared in fractions 26–60. After removal of the solvent in vacuo, the resulting solid was recrystallized from water to yield 0.645 g. The filtrate from the crystallization was freeze dried to yield 1.257 g. Total yield 1.902 g., 34.8%. An analytical sample was prepared by recrystallization from water and dried in vacuo at 110°, M.P. 294–298° decomp.

*Analysis.*—Calc'd for $C_9H_{12}N_3O_7P$ (percent): C, 35.39; H, 3.96; N, 13.76. Found (percent): C, 35.43; H, 4.04; N, 13.62.

Ultra-violet absorption: pH 1, $\lambda_{max}$ 277 ($\epsilon$ 14,200); pH 11, $\lambda_{max}$ 268 ($\epsilon$ 10,400), 236 ($\epsilon$ 8,550); pH 7, $\lambda_{max}$ 268 ($\epsilon$ 10,400). PMR data—spectra obtained on a Hitachi 60 spectrometer; chemical shifts are reported downfield with an internal standard of SDSS, 2,2-dimethyl-2-silapentane-5-sulfonic acid taken as 0 p.p.m.; solvent was $D_2O$ with NaOR added to dissolve. Coupling constants are in brackets. H–6 δ 7.62 [8]; H–1' δ 6.39 [7]; H–5 δ 6.06 [8]. Electrophoresis pH 7.2 phosphate, 1500 v., reference uridine 5'-phosphate; for II, one spot, R =0.72 for uridine-3',5'-cyclic phosphate, R=0.70.

EXAMPLE 2

1-β-D-arabinofuranosyl-uracil-3',5'-cyclic phosphate (6)

A solution of 1-(β-D-arabinofuranosyl)-cytosine-3',5'-cyclic phosphate sodium salt (0.700 g., 2.14 mmol) in 60 ml. AcOH—$H_2O$ (5:1) was heated in an oil bath at 60°, and $NaNO_2$ in portions of 60 mg. was added every hour until the UV of the solution exhibited absorption maximum at 262 mμ at pH 1. The solution was then concentrated to dryness in vacuo, followed by addition and evaporation of EtOH. The residue was dissolved in $H_2O$ (20 ml.) and applied to a column (60 milliequivalents) of Dowex 50 w x 8 ion exchange resin H+ form. Water eluted the uracil nucleotides first, this was followed by a separate peak containing some cytosine nucleotide. Fractions containing the uracil nucleotides were combined, and applied to a column packed with Sleicher and Schuell standard grade DEAE cellulose bicarbonate form (200 ml. wet volume). Elution was carried out with a linear gradient of $H_2O$ (1.5 l.) and 0.125 M triethylammonium bicarbonate solution (1.5 l.). 3 UV absorbing peaks were eluted from the column, the fractions (39–62, 20 ml. each) representing the 2nd peak were combined and concentrated to dryness in vacuo.

The residue was dissolved in $H_2O$ (20 ml.) and this solution was passed through a column of Dowex 50 w x 8 H+ form (40 milliequivalents). The eluate was concentrated and lypholized to give an amorphous powder, 0.293 g., 45%. A portion was crystallized from EtOH for analysis.

*Analysis.*—Calculated for $C_9H_{11}N_2PO_8$ (percent): C, 35.30; H, 3.62; N, 9.15. Found (percent): C, 34.38; H, 3:30; N, 9.02.

Ultraviolet absorption: pH 1, $\lambda_{max}$ 262 ($\epsilon$ 7,260); pH 11 $\lambda_{max}$ 260 ($\epsilon$ 6,000). PMR spectrum in $D_2O$ with SDSS internal standard: H–6 δ 7.68 [7.5]; H–1' δ 6.36 [7.0]; H–5 δ 5.9 [7.5].

Paper electrophoresis at pH 7.2 phosphate buffer, 1 spot only.

EXAMPLE 3

1-(β-D-arabinofuranosyl)-4-thiouracil-3',5'-cyclic phosphate (9)

A solution of 1-(β-D-arabinofuranosyl)-cytosine-3',5'-cyclic phosphate (0.915 g., 3 mmol) in 9 ml. of $H_2O$ was placed in a steel bomb and cooled in Dry Ice-acetone bath. A mixture of pyridine (12 ml.) and liquid $H_2S$ (24 ml.) was added and the bomb was heated at 60° for 48 hours. After cooling to −80° the bomb was opened, allowed to come to room temperature, and the contents were concentrated to dryness in vacuo, followed by addition and evaporation of EtOH. The residue was dissolved in $H_2O$ (80 ml.), the solution filtered and applied to a column packed with Sleicher and Schuell standard grade DEAE cellulose (450 ml. wet volume) bicarbonate form. Elution was carried out with a linear gradient of $H_2O$ (2.5 l.) and 0.2 M triethylammonium bicarbonate solution 2.5 liter), the UV of the eluate was monitored continuously at 254 mμ. Fractions 90–154 (20 ml. each) representing the 3rd and major UV absorbing peak were combined and concentrated to dryness in vacuo. The residual yellow powder was dissolved in $H_2O$ (40 ml.) and this solution was passed through a column containing 40 milliequivalents of Dowex 50 wx8 ion exchange resin H+ form. The eluate was concentrated in vacuo, and EtOH was added and evaporated several times in order to remove residual $H_2O$. The residual yellow powder was dried in vacuo to give pure 1-(β-D-arabinofuranosyl)-4-thiouracil-3',5'-cyclic phosphate, 0.837 g. 86.5%. Crystallization from EtOH furnished a sample of analytical purity, M.P. with dec. 220°.

*Analysis.*—Calculated for $C_9H_{11}N_2O_7PS$ (percent): C, 33.54; H, 3.44; N, 8.69. Found (percent): C, 33.85; H, 3.40; N, 8.74.

Ultraviolet absorption: pH 1, $\lambda_{max}$ 330 ($\epsilon$ 21,800); pH 11, $\lambda_{max}$ 317 ($\epsilon$ 21,600); H$_2$O, $\lambda_{max}$ 330 ($\epsilon$ 23,200).
PMR spectrum in D$_2$O with SDSS internal standard: H-6 $\delta$ 7.55 [7]; H-5 $\delta$ 6.58 [7]; H-1' $\delta$ 6.32 [6].
Paper electrophoresis in pH 7.2 phosphate buffer at 1500 v. reference N$_1$-($\beta$-D-arabinofuranosyl)-4-thiouracil-3'-phosphate, one spot, Rf=0.48.

EXAMPLE 4

1-($\beta$-D-arabinofuranosyl)-4-methylthio-2-oxo-pyrimidine-3',5'-cyclic phosphate ammonium salt (10

To a solution of 1-($\beta$-D-arabinofuranosyl)-4-thiouracil-3',5'-cyclic phosphate (0.322 g., 1 mmol) in 5 ml. of MeOH—H$_2$O (8:2) was added conc NH$_4$OH dropwise until pH was adjusted to 11. Methyliodide (1 ml.) was added, and the solution stirred at room temperature for 5 hours, then kept at 5° for 12 hours. Crystalline NH$_4$I was removed by filtration, the filtrate was concentrated to dryness in vacuo. The residue was dissolved in H$_2$O (25 ml.) and applied to a column of Sleicher and Schuell standard grade DEAE cellulose bicarbonate form (150 ml. wet volume). Elution was carried out with a linear gradient of H$_2$O (1 liter) and 0.18 M triethylammonium bicarbonate (1 liter). Fractions 28–54 (20 ml. each) representing the 2nd and major UV absorbing component were combined and concentrated to dryness in vacuo. The white solid residue was dissolved in H$_2$O (20 ml.) and passed down a column of Dowex 50 wx8 ion exchange resin, NH$_4$$^+$ form. The eluate was concentrated to dryness and crystallized from EtOH, crystals were dried at 110° in vacuo, 0.165 g., 47%, M.P. dec. 245°.

*Analysis.*—Calculated for C$_{10}$H$_{16}$N$_3$O$_7$PS (percent): C, 33.99; H, 4.56; N, 11.89. Found (percent): C, 33.71; H, 4.61; N, 12.03.
Ultraviolet absorption pH 11, $\lambda_{max}$ 303 ($\epsilon$ 14,900); H$_2$O $\lambda_{max}$ 303 ($\epsilon$ 15,150). PMR spectrum in D$_2$O with SDSS internal standard: H-6 $\delta$ 7.80 [7]; H-5 $\delta$ 6.63 [7]; H-1' 6.34 [6]; CH$_3$ $\delta$ 2.52.
Paper electrophoresis in pH 7.2 phosphate buffer at 1500 v., one spot only.

EXAMPLE 5

5-fluoro-1-$\beta$-D-arabinofuranosylcytosine-3'-phosphate

To a suspension of 1-$\beta$-D-arabinofuranosylcytosine-3'-phosphate (1.615 g., 5 mmoles) in methanol (50 ml.) was added 1,5-diazobicyclo-[5.4.0]undec-5-ene (0.760 g., 5 mmoles) and the resulting mixture was stirred until all solid had dissolved. The solution was reduced to dryness in vacuo. The resulting foam was dissolved in methanol (200 ml.) and cooled to approximately —78° in a Dry-Ice-acetone bath. To this cold solution was added a solution of trifluoromethylhypofluorite (1.56 g., 15 mmoles) in trichlorofluoromethane (50 ml.). After stirring at —78° for 90 minutes, nitrogen gas was bubbled through the solution to remove excess reagent and the solvent was evaporated under reduced pressure. The resulting solid was treated with 20% triethylamine in 50% aqueous methanol (100 ml.) for 16 hours. The solution was evaporated to dryness in vacuo, water (30 ml.) added and removed in vacuo. The solid was dissolved in water (50 ml.) and applied to a column of Dowex 50 W x 8 (200 ml., 100–200 mesh). The column was developed with water and the appropriate portion of the eluent was reduced to dryness in vacuo. The solid was recrystallized from ethanol-water to yield 0.602 g., 35.3%.

*Analysis.*—Calcd. for C$_9$H$_{13}$N$_3$O$_8$PF. ½ H$_2$O (percent): C, 30.85; H, 4.00; N, 12.00. Found (percent): C, 30.52; H, 4.30; N, 11.74.
Ultraviolet absorption: pH 1, $\lambda_{max}$ 289 ($\epsilon$ 12,100); pH 11, $\lambda_{max}$ 280 ($\epsilon$ 8,850), 237 ($\epsilon$ 8,160); H$_2$O. $\lambda_{max}$ 280 ($\epsilon$ 8,850), 235 ($\epsilon$ 8,500).
PMR spectrum in D$_2$O with SDSS internal standard: H-6, $\delta$ 7.98 [6.5]; H-1', multiplet $\delta$ 6.19, no H-5 signal.
Fluorine spectra: D$_2$O with NaOD added, CCl$_3$F external standard $\delta$ 166.16 p.p.m.

5-fluoro-1-$\beta$-D-arabinofuranosylcytosine-3',5'-cyclic phosphate

5 - fluoro-1-$\beta$-arabinofuranosylcytosine - 3' - phosphate (1.100 g., 3.23 mmoles) and 4-morpholino-N,N$^1$-dicyclohexylcarboxamidine (0.945 g., 3.23 mmoles) were dissolved in warm pyridine (50 ml.). The solution was reduced to a dry foam in vacuo. This foam was dissolved in dry pyridine (90 ml.) and added dropwise over a period of 90 minutes to a refluxing solution of DCC (3.09 g., 15 mmoles) in pyridine (1,500 ml.). The solution was refluxed a total of 4 hours. The product was isolated from a DEAE cellulose column utilizing the same procedure as for isolation of N$_1$-$\beta$-D-arabinofuranosylcytosine-3',5'-cyclic phosphate to yield 0.193 g.

*Analysis.*—Calc'd for C$_9$H$_{11}$N$_3$O$_7$PF. 1.5 H$_2$O (percent): C, 30.85; H, 4.00; N, 12.00. Found (percent): C, 31.10; H, 4.05; N, 11.89.
Ultra-violet absorption: pH 1, $\lambda_{max.}$ 289 ($\epsilon$ 8,330); pH 11, $\lambda_{max.}$ 280 ($\epsilon$ 6,300), 240 ($\epsilon$ 6,480); H$_2$O, $\lambda_{max.}$ 280 ($\epsilon$ 6,300), 237 ($\epsilon$ 6,650).
PMR spectrum in D$_2$O with SDSS internal standard: H-6, $\delta$ 7.78 [6.5], H-1', doublet of doublet, $\delta$ 6.35 [6.5 and 1.5], no H-5 signal.

1 - $\beta$-D-arabinofuranosylcytosine-3',5'-cyclic phosphate in KB cell culture studies exhibited inhibition of herpes simplex virus ranging from 67% to 100% (CPE) with concentration correspondingly ranging from 1.0 to 100 mg./ml. (320 CCID$_{50}$/ml.). With primary mouse embryo cells inhibition ranged from 25% to 100% with concentration correspondingly ranging from 1.0 to 32 mg./ml. (32 CCID$_{50}$/ml. In each case, the compound was but slightly toxic at 1000 mg./ml., while in the case of the ME cells the compound was non-toxic at 1.0–10 mg./ml. In each case virus rating was 1.4, as determined by the virus rating (VR) method of Sidewell et al., Appl. Microbiol. 22, 797 (1971). V.R.>1.0 is indicative of definite antiviral activity, V.R. of 0.5–0.9 is indicative of moderate antiviral activity, and VR<0.5 suggests slight or no apparent antiviral activity. Other in vitro tests with vaccinia, pseudorabies, myxoma and murine cytomegalo viruses demonstrated marked CPE inhibition, indicating ara-C-3',5'-cyclic phosphate to have equal, if not higher, activity than ara-C itself against DNA viruses of the Herpesvirus and Poxvirus families.

In addition to the above, 1-$\beta$-D-arabinofuranosylcytosine-3',5'-cyclic phosphate exhibited significant activity against herpes keratitis infections in experimentally inoculated rabbits.

Most interestingly, the 3',5' cyclic phosphate proved markedly superior to ara-C in the treatment of mice intracerebrally infected with 10 LD 50 herpes simplex virus. 40 mg./kg. of compound was administered intracerebrally 6 hours after infection. Ara-C did not increase the number of survivors relative to the saline-treated controls, whereas ara-C-3',5'-cyclic phosphate increased that number by 7. On the other hand, ara-C increased mean survival time substantially more than did the cyclic compound, permitting the conclusion that its ultimate failure to enhance survival stemmed from enzymatic degradation not suffered by the cyclic nucleotide.

The antiviral activity of the 5-fluoro nucleotides of the invention appears from Table I:

TABLE I

| Compound | Non-cancerous pseudo rabies [1] (VR) | Myxoma [1] (VR) |
|---|---|---|
| 5-fluoro-ara-C-3'-phosphate | 0.8 | 0.8 |
| 5-fluoro-ara-C-3',5'-cyclic | 1.0 | 0.9 |

[1] Cell line: RK-13.

Compound 9, the thiouracil analog, has exhibited properties associated with immunosuppressive activity, as determined by measuring its effect upon uptake of tritiated thymidine (i.e., DNA synthesis) into trichloroacetic acid-precipitatable biopolymers. Compound 10, the methylthio analog, has displayed activity in vitro against HeLa and KB tumor cells, proving equal in effect to ara-C-3',5'-cyclic phosphate and superior to ara-C itself as against the latter cell line.

We claim:
1. A compound selected from the group consisting of (1), compounds of structure

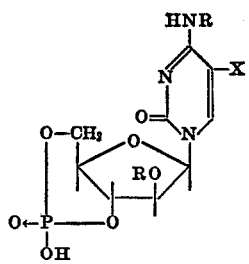

wherein R is hydrogen or $C_1$-$C_{18}$ acyl and X is hydrogen or halogen, and (2), physiologically acceptable salts thereof.

2. An $N^3$-oxide of a compound according to claim 1.
3. 1-β-D-arabinofuranosylcytosine - 3',5' - cyclic phosphate.
4. 1-β-D-arabinofuranosyl - 5 - fluorocytosine13',5'-cyclic phosphate.
5. 1-β-D-arabinofuranosyl - 5 - chlorocytosine-3',5'-cyclic phosphate.
6. 1-β-D-arabinofuranosyl - 5 - iodocytosine-3',5'-cyclic phosphate.
7. 1-β-D-arabinofuranosyl - 5 - bromocytosine-3',5'-cyclic phosphate.
8. A compound selected from the group consisting of compounds of structure

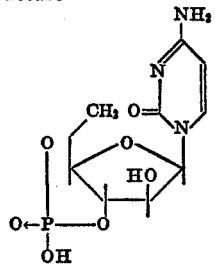

and physiologically acceptable salts thereof.

9. A compound selected from the group consisting of (1) compounds of structure

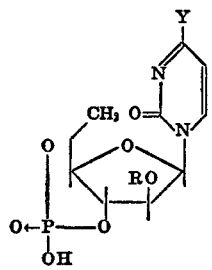

wherein R is hydrogen or $C_1$-$C_{18}$ acyl and Y is selected from the group consisting of amino-, hydroxyl-, chloro-, mercapto-, and methylthio-, and (2) physiologically acceptable salts thereof.

10. An $N^3$-oxide of a compound according to claim 9.
11. 1-β-D-arabinofuranosyl-uracil - 3',5' - cyclic phosphate.
12. 1-β-D-arabinofuranosyl - 4 - thiouracil-3',5'-cyclic phosphate.
13. 1-β-D-arabinofuranosyl - 4 - methylthio-2-oxo-pyrimidine-3',5'-cyclic phosphate.

References Cited
UNITED STATES PATENTS 3,338,882  8/1967  Wechter _____ 260—211.5 R
3,462,416  8/1969  Hanze et al. ____ 260—211.5 R

OTHER REFERENCES

Smith, et al., "Jour. Amer. Chem. Soc.," vol. 83, pp. 698-703, 1961.

JOHNNIE R. BROWN, Primary Examiner

U.S. Cl. X.R.
424—180